(12) United States Patent
Beil et al.

(10) Patent No.: US 11,215,313 B1
(45) Date of Patent: Jan. 4, 2022

(54) DISPLAY MOUNTS AND RELATED SYSTEMS AND METHODS

(71) Applicant: WirePath Home Systems, LLC, Salt Lake City, UT (US)

(72) Inventors: Derrick Alan Beil, Charlotte, NC (US); Emily Patricia Jones, Charlotte, NC (US); Robert Eugene Brunett, III, Belmont, NC (US)

(73) Assignee: Snap One, LLC, Salt Lake City, UT (US)

( * ) Notice: Subject to any disclaimer, the term of this patent is extended or adjusted under 35 U.S.C. 154(b) by 0 days.

(21) Appl. No.: 16/882,056

(22) Filed: May 22, 2020

Related U.S. Application Data

(60) Provisional application No. 62/852,487, filed on May 24, 2019.

(51) Int. Cl.
*F16M 11/04* (2006.01)
*F16M 11/08* (2006.01)
*F16M 13/02* (2006.01)
*F16M 11/18* (2006.01)

(52) U.S. Cl.
CPC ........... *F16M 11/04* (2013.01); *F16M 11/045* (2013.01); *F16M 11/046* (2013.01); *F16M 11/08* (2013.01); *F16M 11/18* (2013.01); *F16M 13/022* (2013.01)

(58) Field of Classification Search
CPC .... F16M 11/04; F16M 11/045; F16M 11/046; F16M 11/08; F16M 11/18; F16M 13/022; F16M 11/105; F16M 11/12; F16M 11/125; F16M 11/126; F16M 11/128; Y10S 248/921; Y10S 248/922
USPC .... 248/283.1, 917–923, 125.1–125.2, 124.1, 248/180.1
See application file for complete search history.

(56) References Cited

U.S. PATENT DOCUMENTS

| | | | | |
|---|---|---|---|---|
| 5,941,493 | A * | 8/1999 | Cheng | F16M 11/105 248/371 |
| 6,279,860 | B1 * | 8/2001 | Swanger | B66F 3/16 248/125.2 |
| 7,028,961 | B1 * | 4/2006 | Dittmer | F16M 11/04 248/278.1 |
| 7,448,584 | B2 * | 11/2008 | Chen | F16M 11/10 248/122.1 |
| 7,793,903 | B2 * | 9/2010 | Dittmer | F16M 11/048 248/276.1 |
| 7,878,123 | B2 * | 2/2011 | Jackson | F16M 11/14 105/144 |
| 7,984,889 | B2 * | 7/2011 | Whitley | F16M 11/16 248/371 |

(Continued)

*Primary Examiner* — Christopher Garft
(74) *Attorney, Agent, or Firm* — Austin Rapp

(57) ABSTRACT

A display mount is described. The display mount includes a wall bracket and a wall mount assembly connected to the wall bracket. The wall mount assembly includes a wall plate. The display mount also includes at least one articulating arm with a first end of the at least one articulating arm connected to the wall plate. The display mount further includes a mount head assembly connected to a second end of the at least one articulating arm. The mount head assembly is configured to receive a display thereon. The wall mount assembly also includes a vertical height adjustment mechanism that is configured to adjust the vertical height of the wall plate.

17 Claims, 15 Drawing Sheets

(56) References Cited

U.S. PATENT DOCUMENTS

| | | | |
|---|---|---|---|
| 10,010,177 B1* | 7/2018 | Pei | F16M 11/2014 |
| 10,047,902 B2* | 8/2018 | Lukach | F16M 13/022 |
| 10,563,811 B2* | 2/2020 | Pei | F16M 11/2092 |
| 10,595,634 B2* | 3/2020 | Pei | F16M 11/2092 |
| 10,944,937 B2* | 3/2021 | Pei | F16M 11/2085 |
| 2005/0087666 A1* | 4/2005 | Hwang | F16M 13/02 248/371 |
| 2005/0127253 A1* | 6/2005 | Kim | F16M 13/02 248/176.1 |
| 2006/0022102 A1* | 2/2006 | Dittmer | F16M 13/02 248/276.1 |
| 2007/0195495 A1* | 8/2007 | Kim | F16M 11/24 361/679.07 |
| 2007/0275571 A1* | 11/2007 | Tsuo | F16M 11/105 439/15 |
| 2008/0006751 A1* | 1/2008 | Chen | F16M 11/10 248/278.1 |
| 2010/0091438 A1* | 4/2010 | Dittmer | F16M 11/2092 361/679.01 |
| 2010/0326930 A1* | 12/2010 | Chiang | F16M 11/2014 211/26 |
| 2013/0187019 A1* | 7/2013 | Dittmer | F16M 11/2092 248/277.1 |
| 2014/0197289 A1* | 7/2014 | Chen | F16M 11/105 248/214 |
| 2015/0250315 A1* | 9/2015 | Gross | H05K 5/0017 361/679.01 |
| 2017/0051865 A1* | 2/2017 | Chen | F16M 11/046 |
| 2018/0177299 A1* | 6/2018 | Pei | F16M 13/02 |
| 2019/0203873 A1* | 7/2019 | Pei | F16M 11/126 |
| 2019/0390817 A1* | 12/2019 | PEI | F16M 11/10 |
| 2020/0120305 A1* | 4/2020 | Pei | A47B 97/001 |
| 2020/0208774 A1* | 7/2020 | Pei | F16M 11/2092 |
| 2020/0340614 A1* | 10/2020 | Pei | F16M 11/2092 |
| 2021/0010632 A1* | 1/2021 | Pei | F16M 13/02 |

\* cited by examiner

DISPLAY MOUNTS AND RELATED SYSTEMS AND METHODS

RELATED APPLICATIONS

This application is related to and claims priority from U.S. Provisional Patent Application No. 62/852,487, filed May 24, 2019, for "DISPLAY MOUNTS AND RELATED SYSTEMS AND METHODS," which is hereby incorporated by reference in its entirety.

TECHNICAL FIELD

The present disclosure relates generally to mounting hardware. More specifically, the present disclosure relates to systems and methods for adjustable display mounts.

BACKGROUND

Display mounts are used to mount displays such as televisions to a mounting surface such as a wall. Known mounts provide limited adjustment after the mount has been connected to the wall and the display has been installed on the mount.

DETAILED DESCRIPTION

Figure 1:
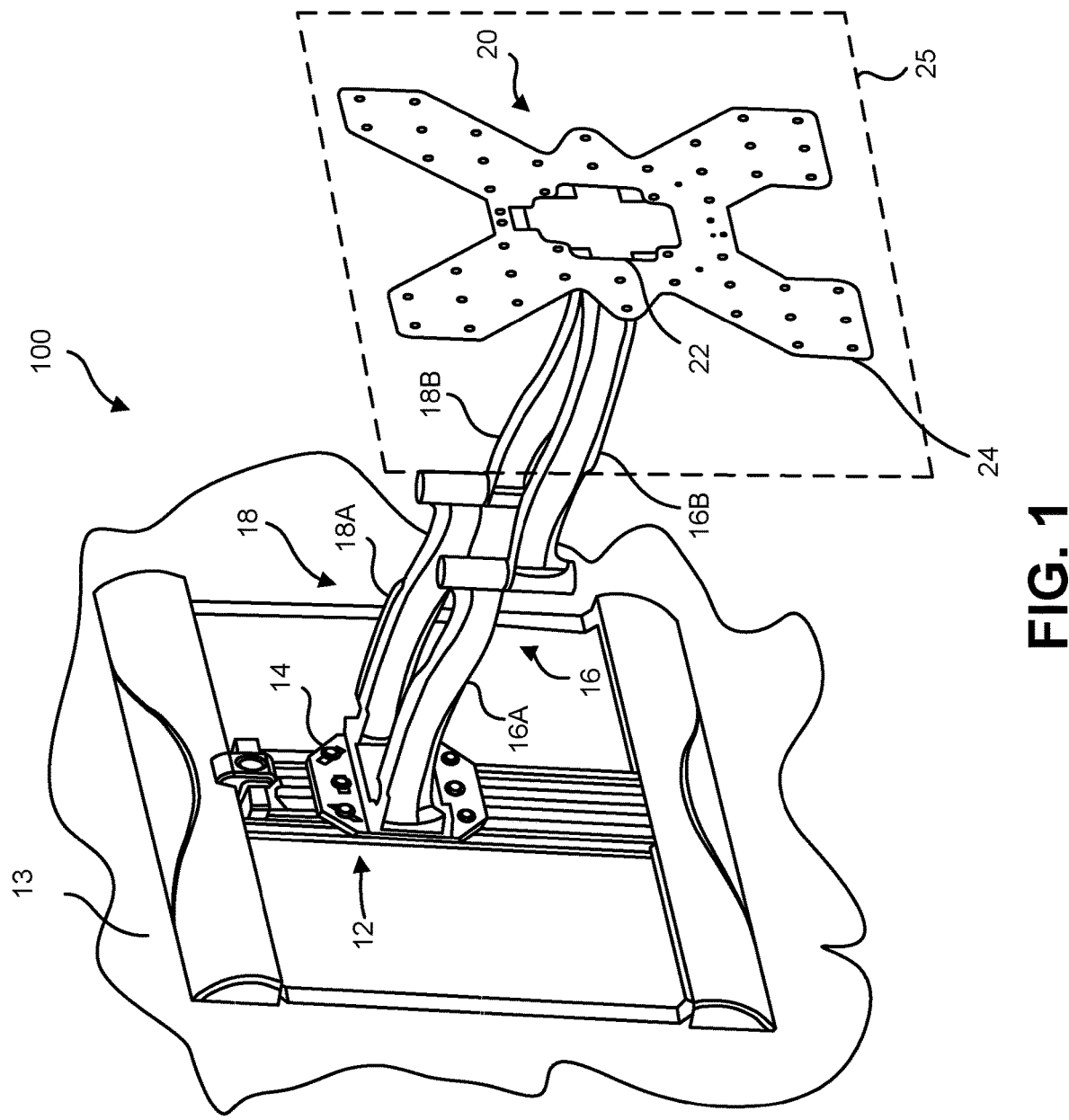
FIG. 1 is a perspective view of an example display mount.

A display mount is described. The display mount includes a wall bracket and a wall mount assembly connected to the wall bracket. The wall mount assembly includes a wall plate. The display mount also includes at least one articulating arm with a first end of the at least one articulating arm connected to the wall plate. The display mount further includes a mount head assembly connected to a second end of the at least one articulating arm. The mount head assembly is configured to receive a display thereon. The wall mount assembly also includes a vertical height adjustment mechanism that is configured to adjust the vertical height of the wall plate.

The vertical height adjustment mechanism may include a drive mechanism, a gear assembly connected to the drive mechanism, a lead screw connected to the gear assembly, and a lead nut received on the lead screw. The lead nut may be connected to the wall plate. The wall plate may move upward in response to rotation of the drive mechanism in a first direction and moves downward in response to rotation of the drive mechanism in a second, opposite direction.

The vertical height adjustment mechanism may be configured to adjust a vertical height of the wall plate, the at least one articulating arm, the mount head assembly, and a display connected to the mount head assembly.

The display mount may also include a leveling mechanism configured to level the wall plate. In some examples, the leveling mechanism may include an upper slot defined in an upper portion of the wall plate and a first fastener received in the upper slot, and a lower slot defined in a lower portion of the wall plate and a second fastener received in the lower slot. The first and second fasteners may each be connected to the lead nut. In other examples, the leveling mechanism may include a slot defined in the mount head assembly and a first fastener received in the slot. The leveling mechanism may also include a second fastener forming a pivot point to rotate the mount head assembly.

Another example of a display mount is described. The display mount includes a wall bracket and a wall mount assembly connected to the wall bracket. The wall mount assembly includes a wall plate, a vertical height adjustment mechanism that is configured to adjust a vertical height of the wall plate, and a horizontal adjustment mechanism configured to adjust a horizontal position of the wall plate. The display mount also includes at least one articulating arm with a first end of the at least one articulating arm connected to the wall plate. The display mount further includes a mount head assembly connected to a second end of the at least one articulating arm, the mount head assembly configured to receive a display thereon.

The wall bracket may include an upper wall rail defining an upper channel and a lower wall rail defining a lower channel. The wall mount assembly may include a vertical track.

The horizontal adjustment mechanism may include at least one upper roller or slider connected to an upper portion of the vertical track and at least one lower roller or slider connected to a lower portion of the vertical track. The at least one upper roller or slider may be received in the upper channel. The at least one lower roller or slider may be received in the lower channel. The horizontal adjustment mechanism may include a fastener configured to engage one of the upper and lower rails to lock the horizontal adjustment mechanism.

The horizontal adjustment mechanism may be configured to adjust a horizontal position of the vertical track, the wall plate, the at least one articulating arm, the mount head assembly, and a display connected to the mount head assembly.

A method is also described. The method includes providing a display mount that includes a wall bracket, a wall mount assembly connected to the wall bracket, at least one articulating arm with a first end of the at least one articulating arm connected to the wall plate, and a mount head assembly connected to a second end of the at least one articulating arm. The wall mount assembly includes a wall plate and a vertical height adjustment mechanism. The method also includes connecting a display to the mount head assembly. The method further includes using the vertical height adjustment mechanism to adjust a vertical height of the wall plate, the at least one articulating arm, the mount head assembly, and the display.

Using the vertical height adjustment mechanism to adjust a vertical height of the wall plate may include moving the wall plate, the at least one articulating arm, the mount head assembly, and the display upward in response to rotating the drive mechanism in a first direction. Using the vertical height adjustment mechanism to adjust a vertical height of the wall plate may also include moving the wall plate, the at least one articulating arm, the mount head assembly, and the display downward in response to rotating the drive mechanism in a second, opposite direction.

The wall mount assembly may include a horizontal adjustment mechanism. In this case, the method may include using the horizontal adjustment mechanism to adjust a horizontal position of the wall plate, the at least one articulating arm, the mount head assembly, and the display after connecting the display to the mount head assembly.

The wall bracket may include an upper wall rail defining an upper channel and a lower wall rail defining a lower channel. The wall mount assembly may include a vertical track. The horizontal adjustment mechanism may include at least one upper roller connected to an upper portion of the vertical track and at least one lower roller connected to a lower portion of the vertical track. The at least one upper roller may be received in the upper channel and the at least one lower roller may be received in the lower channel.

The method may also include applying a force to at least one of the vertical track, the wall plate, the at least one articulating arm, the mount head assembly, and the display. The method may further include moving the at least one of the vertical track, the wall plate, the at least one articulating arm, the mount head assembly, and the display left or right such that the at least one upper roller rolls in the upper channel and the at least one lower roller rolls in the lower channel.

The wall mount assembly may include a leveling mechanism on the wall plate. In this case, the method may further include using the leveling mechanism to level the wall plate, the at least one articulating arm, the mount head assembly, and the display after connecting the display to the mount head assembly.

The mount head assembly may include a leveling mechanism. In this case, the method further include using the leveling mechanism to level the mount head assembly and the display after connecting the display to the mount head assembly.

Various configurations are now described with reference to the Figures, where like reference numbers may indicate functionally similar elements. The apparatus, systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the apparatus, systems and methods. As used herein, the term "plurality" may indicate two or more. For example, a plurality of components may refer to two or more components.

The present apparatus, systems and methods will be described more fully hereinafter with reference to the accompanying drawings, in which illustrative implementations of the apparatus, systems and methods are shown. In the drawings, the relative sizes of regions or features may be exaggerated for clarity. The described apparatus, systems and methods may, however, be implemented in many different forms and should not be construed as limited to the implementations set forth herein; rather, these implementations are provided so that this disclosure will be thorough and complete, and will fully convey the scope of the apparatus, systems and methods to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular implementations only and is not intended to be limiting of the apparatus, systems and methods. As used herein, the singular forms "a", "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It is noted that any one or more aspects or features described with respect to one implementation may be incorporated in a different implementation although not specifically described relative thereto. That is, all implementations and/or features of any implementation can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present apparatus, systems and methods are explained in detail in the specification set forth below.

Unless otherwise defined, all terms (including technical and scientific terms) used herein have the same meaning as commonly understood by one of ordinary skill in the art to which the apparatus, systems and methods belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A display mount or display mount system 10 is illustrated in FIG. 1. The display mount 100 includes a wall mount assembly 12 that can be connected to a mounting surface 13 such as a wall. The wall mount assembly 12 includes a wall plate 14. The wall mount assembly 12 is described in more detail below.

The display mount 100 includes first and second articulating arms 16, 18. A first end of each of the arms 16, 18 is connected to and optionally pivotally connected to the wall plate 14. A second, opposite end of each of the arms 16, 18 is connected and optionally pivotally connected to a mount head assembly 20. The first arm 16 includes first and second arm portions or sections 16A, 16B that are pivotally connected to one another. The second arm 18 includes first and second arm portions or sections 18A, 18B that are pivotally connected to one another. As understood by one of ordinary skill in the art, the pivoting connections of the various components can allow for movement of the mount head assembly 20 (and a display connected thereto) in multiple degrees of freedom.

The mount head assembly 20 may include a mount head 22 (also referred to as mount receiver) and a display bracket 24. As shown in dashed lines, a display 25 such as a television may be connected to the mount head 22 and/or the display bracket 24.

Figure 2:
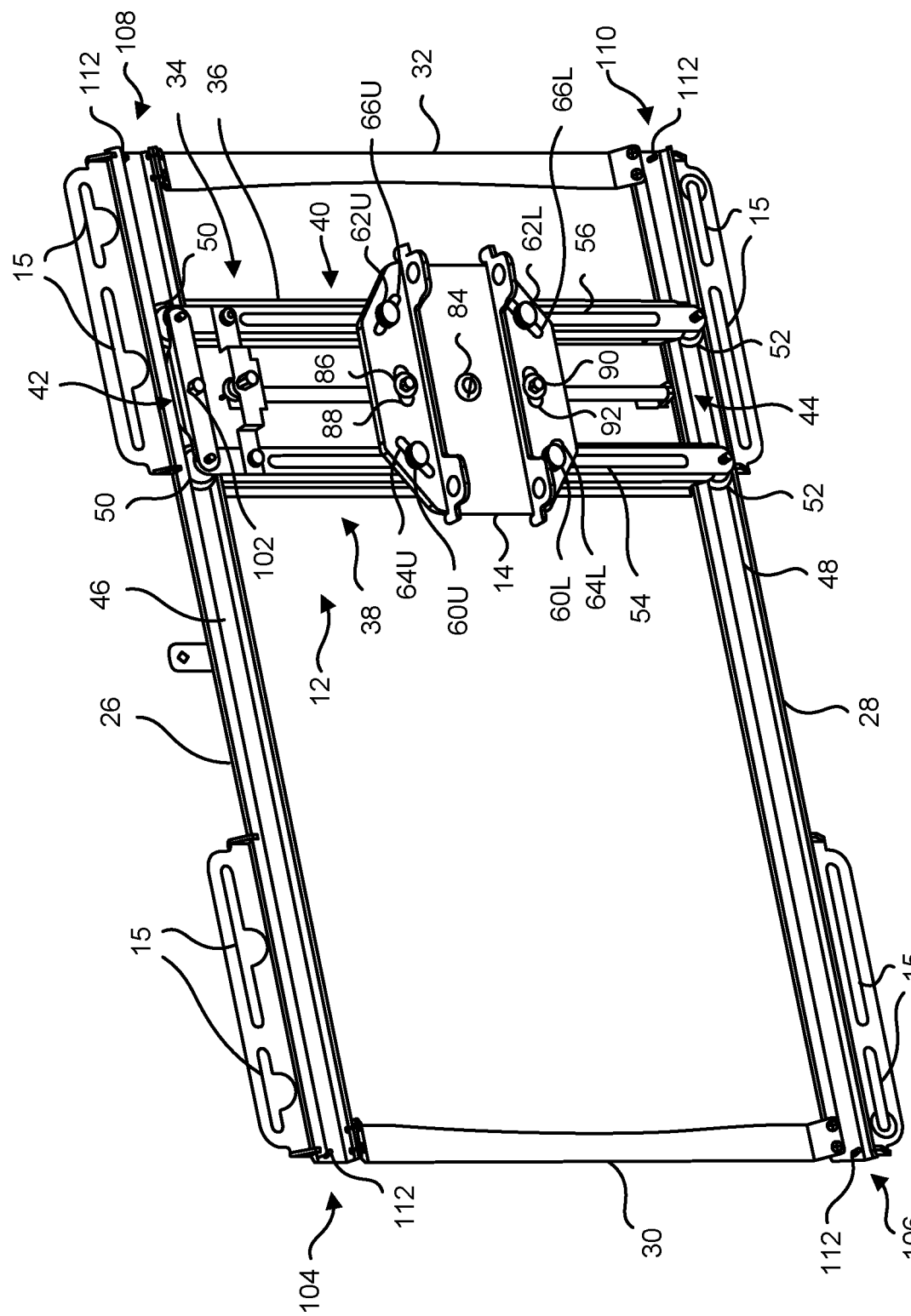
FIG. 2 is a front perspective view of a wall mount assembly of the display mount of FIG. 1.

Referring to FIG. 2, the wall mount assembly 12 includes an upper wall rail 26 and a lower wall rail 28. The upper wall rail 26 and the lower wall rail 28 may each include a plurality of mounting features 15 such as apertures for mounting the rails to the wall. The wall mount assembly 12 optionally includes left and right vertical straps 30, 32 that extend between and connect to each of the upper and lower wall rails 26, 28. The upper wall rail 26, the lower wall rail 28 and the straps 30, 32 (where used) may collectively be referred to herein as a wall bracket 11.

The wall mount assembly 12 includes a vertical track assembly 34. The assembly 34 includes a vertical track or vertical track body 36. The vertical track 36 includes a left side portion 38, a right side portion 40, an upper portion 42, and a lower portion 44.

An upper or first channel 46 is defined in the upper wall rail 26 and a lower or second channel 48 is defined in the lower wall rail 28. One or more rollers or wheels 50 are connected to the upper portion 42 of the vertical track 36 and received in the upper channel 46. One or more rollers or wheels 52 are connected to the lower portion 44 of the vertical track 36 and received in the lower channel 48. As illustrated, one of the wheels 50 is connected to the left side portion 38 of the vertical track 36 and another one of the wheels 50 is connected to the right side portion 40 of the vertical track 36. Also as illustrated, one of the wheels 52 is connected to the left side portion 38 of the vertical track 36 and another one of the wheels 52 is connected to the right side portion 40 of the vertical track 36.

As described in more detail below, the wheels 50 and 52 roll in the channels 46 and 48, respectively, as the vertical track 36 and components connected thereto are moved horizontally. It is contemplated that other mechanisms such as sliders could be employed instead of rollers or wheels with the sliders configured to slide in the channels 46, 48. For example, the display mount 100 may include a number of wheels configured to roll in the upper channel 46 and a slider configured to slide in the lower channel 48. In some examples, the display mount 100 may include more or fewer than two wheels. For example, the display mount 100 may include three wheels configured to roll in the upper channel 46 and a slider configured to slide in the lower channel 48.

Figure 3:
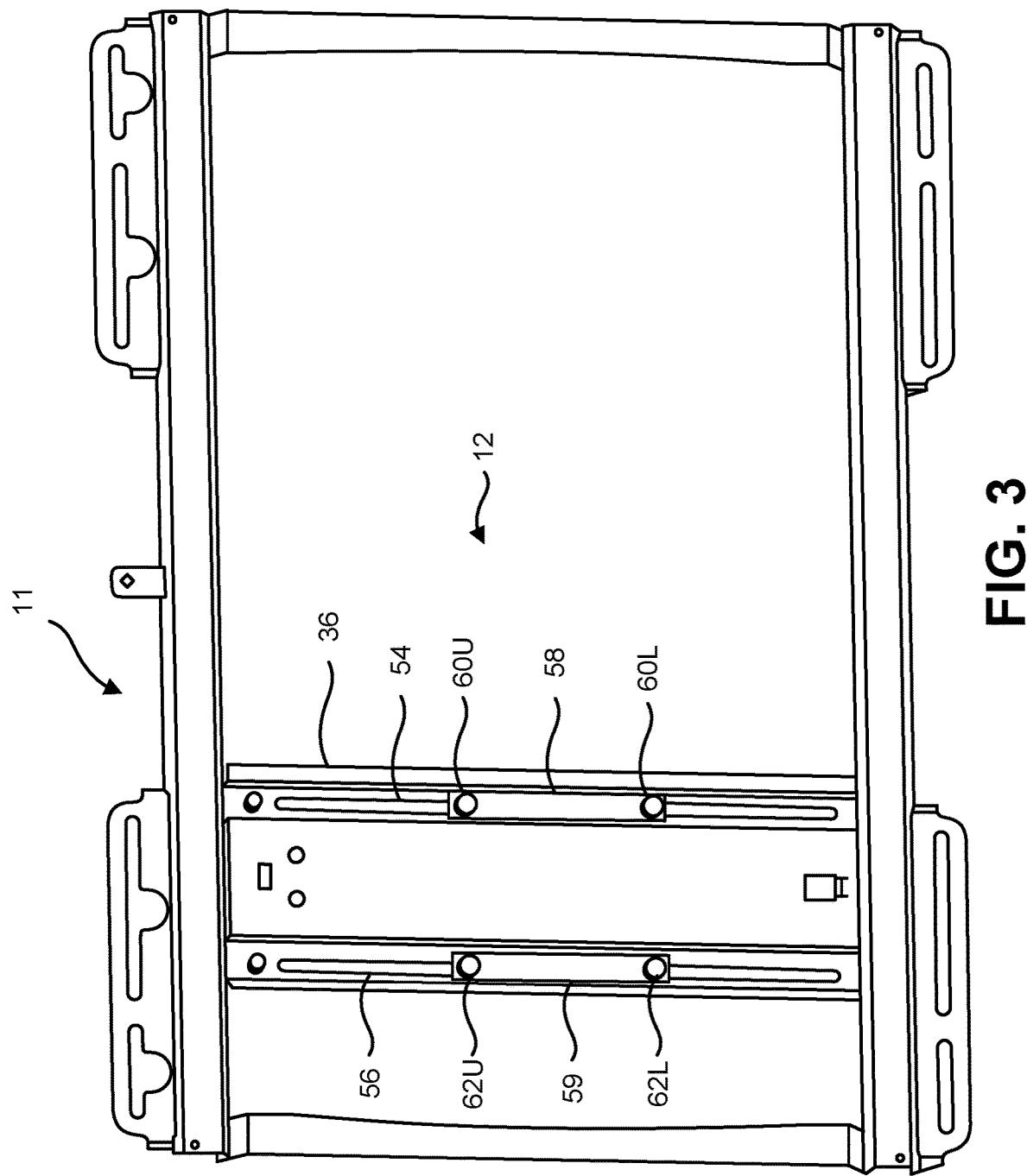
FIG. 3 is a rear view of the wall mount assembly of FIG. 2.

A left or first elongated slot 54 is defined in the left side portion 38 of the vertical track and a right or second elongated slot 56 is defined in the right side portion 40 of the vertical track 36. The wall plate 14 is connected to the vertical track 36. As illustrated in FIGS. 2 and 3, the wall plate 14 is connected to a left or first locking bar 58 with fasteners 60U, 60L that extend through the left slot 54 and to a right or second locking bar 59 with fasteners 62U, 62L that extend through the right slot 56. The wall plate 14 is on a first side of the vertical track 36 and the first and second locking bars 58, 59 are on a second, opposite side of the vertical track 36.

The fasteners 60U, 60L also extend through upper and lower elongated slots 64U, 64L defined in the wall plate 14 and the fasteners 62U, 62L also extend through upper and lower elongated slots 66U, 66L defined in the wall plate 14. As described in more detail below, the slots 64U, 64L, 66U, 66L help allow the wall plate 14 to roll clockwise and counterclockwise.

Figure 4:
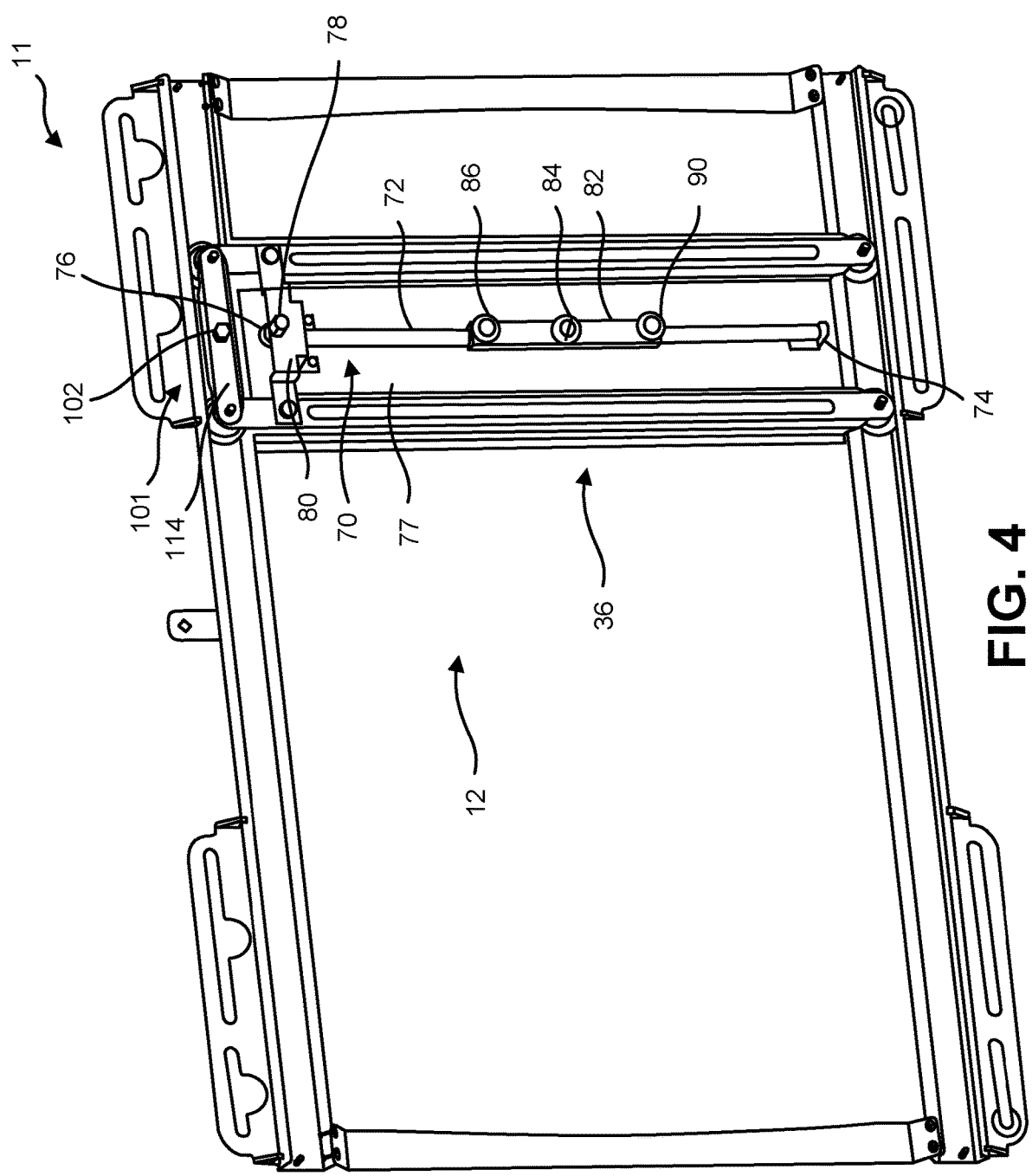
FIG. 4 is a front perspective view of the wall mount assembly of FIG. 2 with certain components removed to illustrate vertical and horizontal adjustment features.
Figure 5:
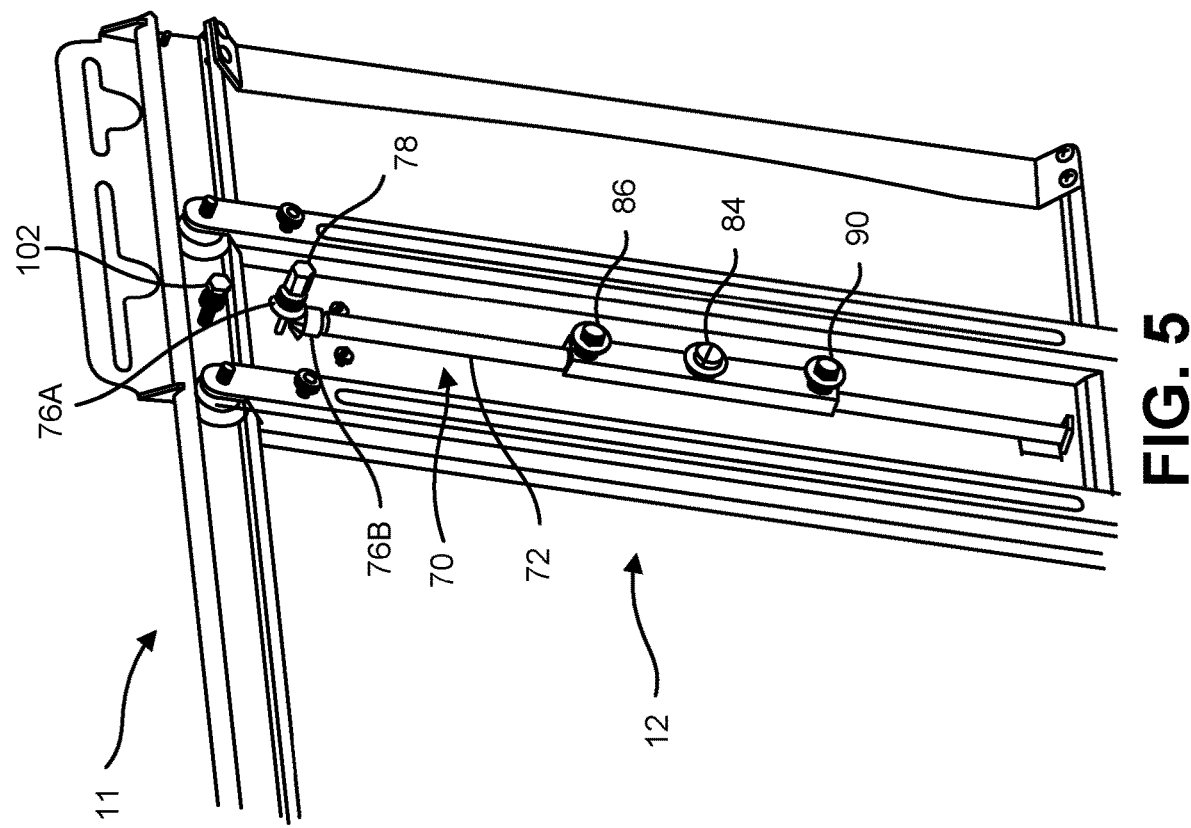
FIG. 5 is a fragmentary front perspective view of the wall mount assembly of FIG. 2 with further components removed to illustrate vertical and horizontal adjustment features.

Referring to FIGS. 4 and 5, the display mount 100 and the wall mount assembly 12 include a vertical height adjustment assembly or mechanism 70. As illustrated, the vertical height adjustment mechanism 70 includes a lead screw 72 that extends between a seat 74 of the vertical track 36 and a gear assembly 76. The lead screw 72, the seat 74, and/or the gear assembly 76 may be at least partially located in a channel 77 defined by the vertical track 36.

The gear assembly 76 may include first and second gears 76A, 76B. The gears 76A, 76B may be bevel gears or mitre gears. A drive mechanism 78 is connected to the gear 76A. In some examples, a rotation axis of the drive mechanism 78 may be oriented perpendicular (e.g., at approximately 90 degrees) to the lead screw 72. It should be noted that this orientation may facilitate accessibility of the drive mechanism 78 for user adjustment of the height of the wall plate 14.

Examples of the drive mechanism 78 include a fastener (e.g., bolt or screw), a post, a shaft, etc. The drive mechanism 78 may include features to interact with a tool. For examples, the drive mechanism 78 may include a head (e.g., hexagonal head) to interact with a socket, wrench or other driver. In another example, the drive mechanism 78 may include an opening configured to receive a driver (e.g., a Phillips screwdriver, Torx head, Allen head, etc.). In yet other examples, the drive mechanism 78 may include a component(s) to allow a user to directly rotate the drive mechanism 78. For example, the drive mechanism 78 may include wing or arm features to which a user may apply a rotational force.

The gear 76B is connected to the lead screw 72. The gears 76A, 76B may be positioned behind or in a gearbox 80 that is connected to the vertical track 36 and the drive mechanism 78 may extend through the gearbox 80.

The vertical height adjustment mechanism 70 further includes an elongated lead nut 82 that is received around the lead screw 72. A fastener 84 connects a central portion of the wall plate 14 and the lead nut 82 (FIGS. 2 and 4).

A first or upper roll adjustment fastener 86 connects an upper portion of the wall plate 14 and the lead nut 82. The fastener 86 (e.g., a bolt or screw) is received through an elongated first or upper slot 88 defined in the upper portion of the wall plate 14. A second or lower roll adjustment fastener 90 connects a lower portion of the wall plate 14 and the lead nut 82. The fastener 90 (e.g., a bolt or screw) is received through a second or lower slot 92 defined in the lower portion of the wall plate 14.

The wall plate 14 is adjustable vertically by rotation of the drive mechanism 78. Specifically, rotation of the drive mechanism 78 in a first direction rotates the gears 76A, 76B and the lead screw 72 and, in response, the lead nut 82 and the wall plate 14 connected thereto translate upwardly. As a result, the arms 16, 18 and the mount head assembly 20 also translate upwardly. Rotation of the drive mechanism 78 in a second, opposite direction rotates the gears 76A, 76B and the lead screw 72 and, in response, the lead nut 82 and the wall plate 14 connected thereto translate downwardly. As a result, the arms 16, 18 and the mount head assembly 20 (and any display connected thereto) also translate downwardly.

In some approaches, display mounts allow for limited vertical adjustment at the mount head assembly. However, this makes it difficult if not impossible to make the vertical adjustment with a display mounted to the mount head assembly. Further, in some approaches, display mounts only allow minimal vertical adjustment, such as about 1 inch of total travel.

In contrast, with the display mount 100, because the vertical adjustment assembly is at the wall plate, a large amount of vertical adjustment can be carried out post-install (i.e., with the display already mounted to the mount head assembly and the display mount 100 attached to the mounting surface 13) via the drive mechanism 78. An installer or user can use a power drill, a wrench or other driver to turn the drive mechanism 78 to move the arms 16, 18 up and down along the lead screw 72. This also allows for small or micro-adjustments to precisely position the display at a desired height. The vertical adjustment assembly may be further useful because television manufacturers are becoming more unpredictable with the placement of VESA patterns on the back of the television so the vertical shift helps ensure that the mount head assembly 20 does not extend below the bottom of the television when sitting flat back against the wall.

Figure 6:
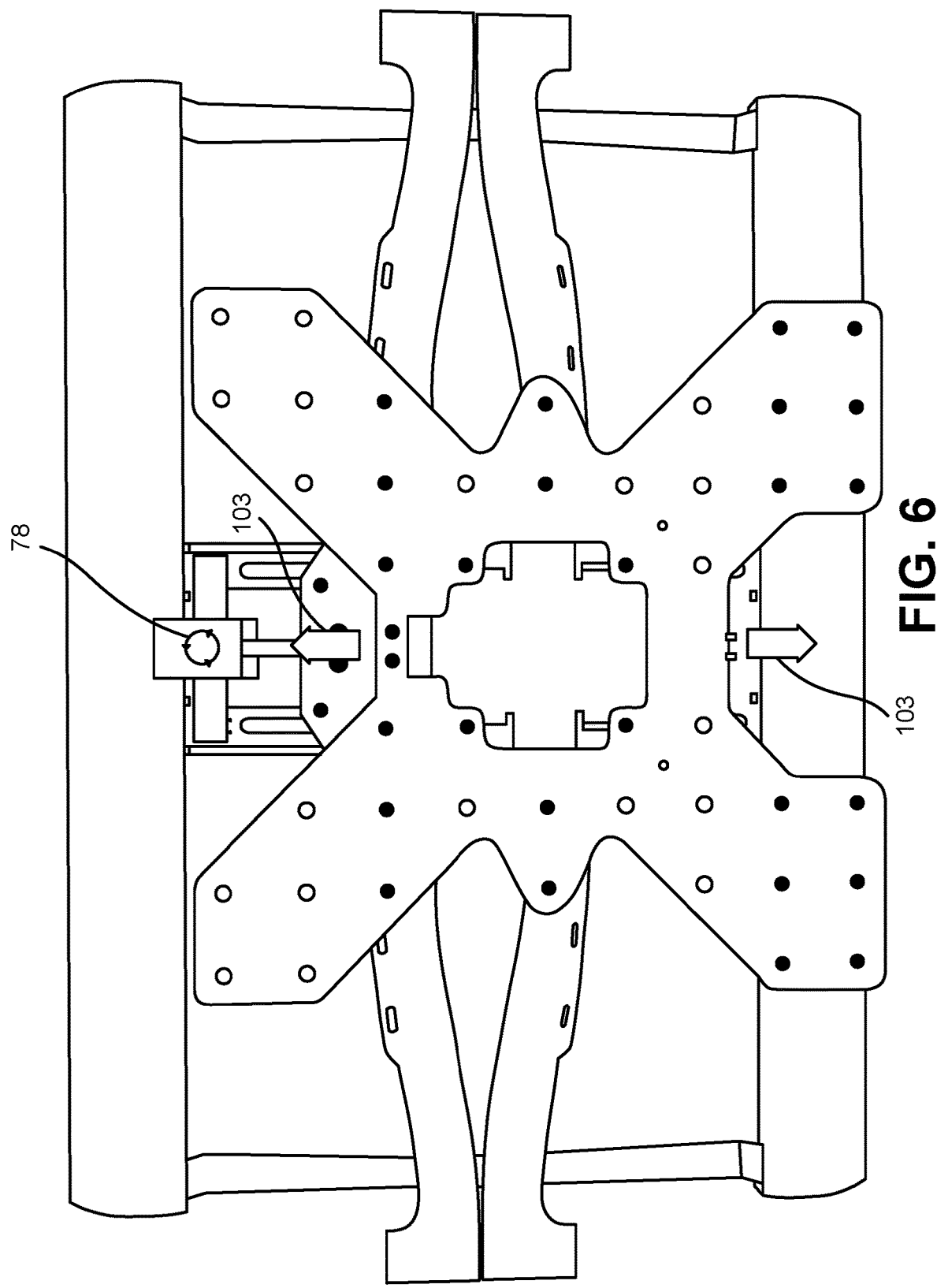
FIG. 6 is a front view of the mount of FIG. 1 illustrating vertical range of motion.

In some implementations, the vertical adjustment assembly provides at least eight inches of vertical shift (up and down). This is further illustrated in FIG. 6. This relatively large amount of vertical shift 103 is provided in part by the elongated vertical track 36 and the elongated lead screw 72 that are positioned at the wall mount assembly 12.

Referring again to FIG. 2, the display mount 100 also includes a horizontal adjustment assembly or mechanism 101 that allows horizontal translation of the vertical track 36, wall plate 14, the arms 16, 18, and the mount head assembly 20 (as well as a display connected thereto). The horizontal adjustment mechanism 101 includes a fastener 102 (e.g., a bolt or screw) that may also be referred to herein as a horizontal shift lock screw. The fastener 102 is configured to be loosened (rotated in a first direction) to allow an installer or user to move the vertical track 36, wall plate 14, the arms 16, 18, and the mount head assembly 20 (as well as a display connected thereto) horizontally. Loosening the fastener 102 frees the wheels 50 and 52 to roll in the channels 46 and 48, respectively, in response to the installer or user grabbing a component such as the vertical track 36 or one of the components connected thereto and moving the component left or right. The horizontal adjustment mechanism 101 may include the wheels 50, 52.

Figure 7:
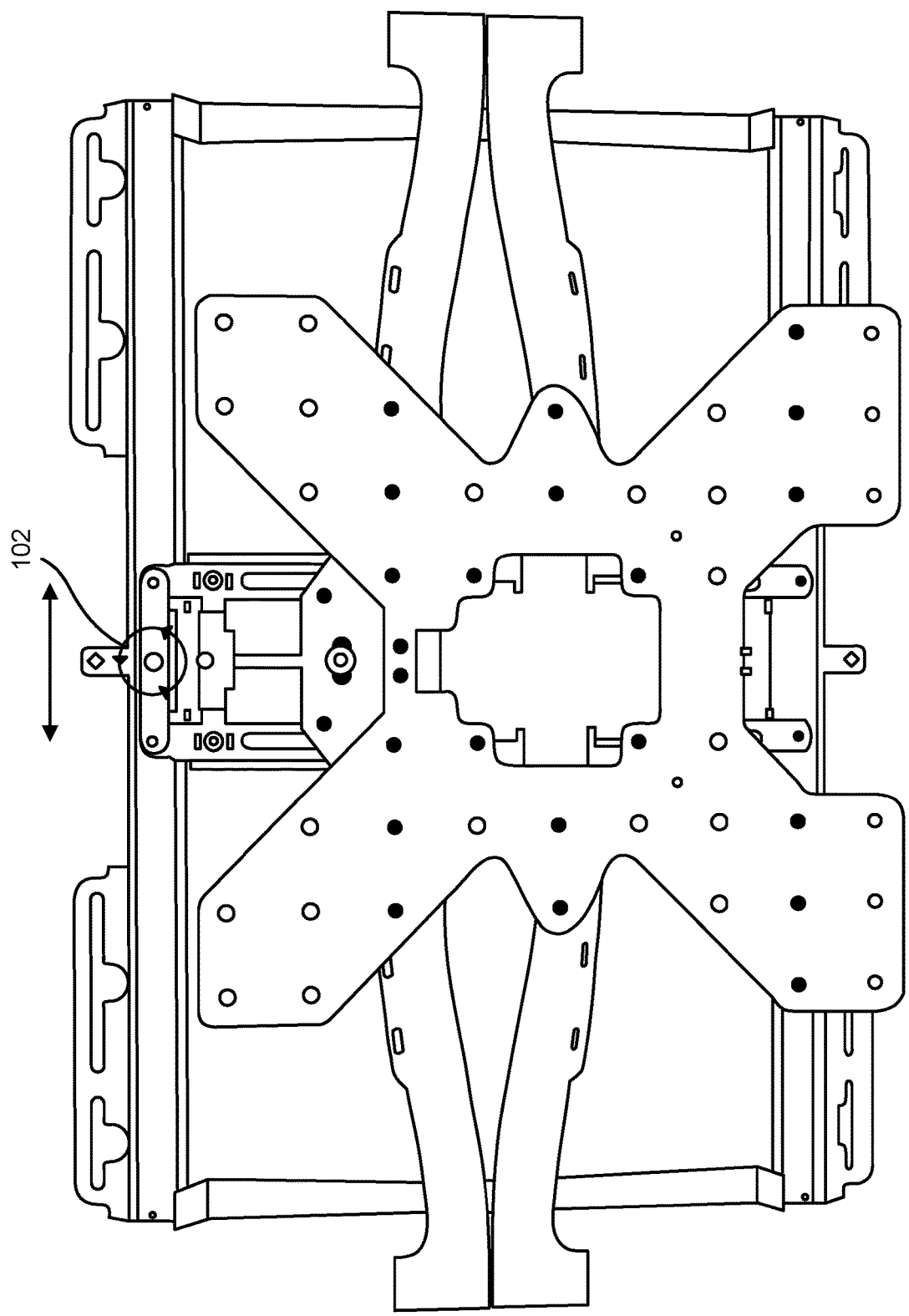
FIG. 7 is a front view of the mount of FIG. 1 illustrating horizontal range of motion.

The vertical track 36 may translate horizontally between a first or left position with the leftmost wheel 50 adjacent a left end 104 of the upper rail 26 and the leftmost wheel 52 adjacent a left end 106 of the lower rail 28 and a second or right position with the rightmost wheel 50 adjacent a right end 108 of the upper rail 26 and the rightmost wheel 52 adjacent a right end 110 of the lower rail 28. There may be stops 112 at the left end 104 of the upper rail 26, the left end 106 of the lower rail 28, the right end 108 of the upper rail 26, and/or the right end 110 of the lower rail 28. In some implementations, the vertical track 36 translates at least 20 inches between the left position and the right position. This is illustrated in FIG. 7.

The fastener 102 may extend through an upper roller cross bar 114 that is connected to the vertical track 36. The fastener 102 can be tightened (rotated in a second, opposite direction) such that the fastener 102 engages the upper rail 26 to lock the vertical track 36 in place.

In some approaches, mounts only allow horizontal adjustment by detaching the arm assembly from the wall bracket and then reattaching the arm assembly at a different position on the wall bracket. This does not allow for fluid horizontal adjustment, and does not allow the adjustment to be performed with a display already installed on the arm assembly (or mount assembly).

In contrast, the display mount 100 allows for fluid horizontal adjustment as described above and the horizontal movement can be carried out post-install (e.g., with the display already mounted to the mount head assembly). This allows for easy adjustment to the desired placement of the display. It also allows access to, for example, a recessed equipment box that may be installed in the wall behind the display mount 100.

The display mount 100 also includes a roll or leveling mechanism that allows the wall plate 14 (and components connected thereto) to be adjusted clockwise or counterclockwise to level the display. With reference to FIG. 2, the leveling mechanism includes the fasteners 86 and 90. The fasteners 86 and 90 may be loosened (e.g., rotated in a first direction) and the wall plate 14 leveled by rotating the wall plate 14 clockwise or counterclockwise with the fasteners 86 and 90 translating in the slots 88 and 92, respectively. The fasteners 60U, 60L, 62U, 62L may translate in the slots 64U, 64L, 66U, and 66L to facilitate the leveling.

In some approaches, leveling adjustments for mounts are performed at the mount head 22. As a result, the display 25 (e.g., television) may be level in the state in which the leveling adjustment is set. For example, if the leveling adjustment is set with the arms collapsed, the display 25 may not be level with the arms fully extended. Likewise, if the leveling adjustment is set with the arms fully extended, the display 25 may not be level with the arms collapsed. Examples of this approach are described in connection with FIGS. 11-14.

In other approaches, the display mount 100 provides for leveling adjustment at the wall plate 14. This may allow the display 25 to stay level throughout the entire articulating motion of the display mount 100. Also, this approach may provide ease of access to perform the leveling adjustment.

Figure 8:
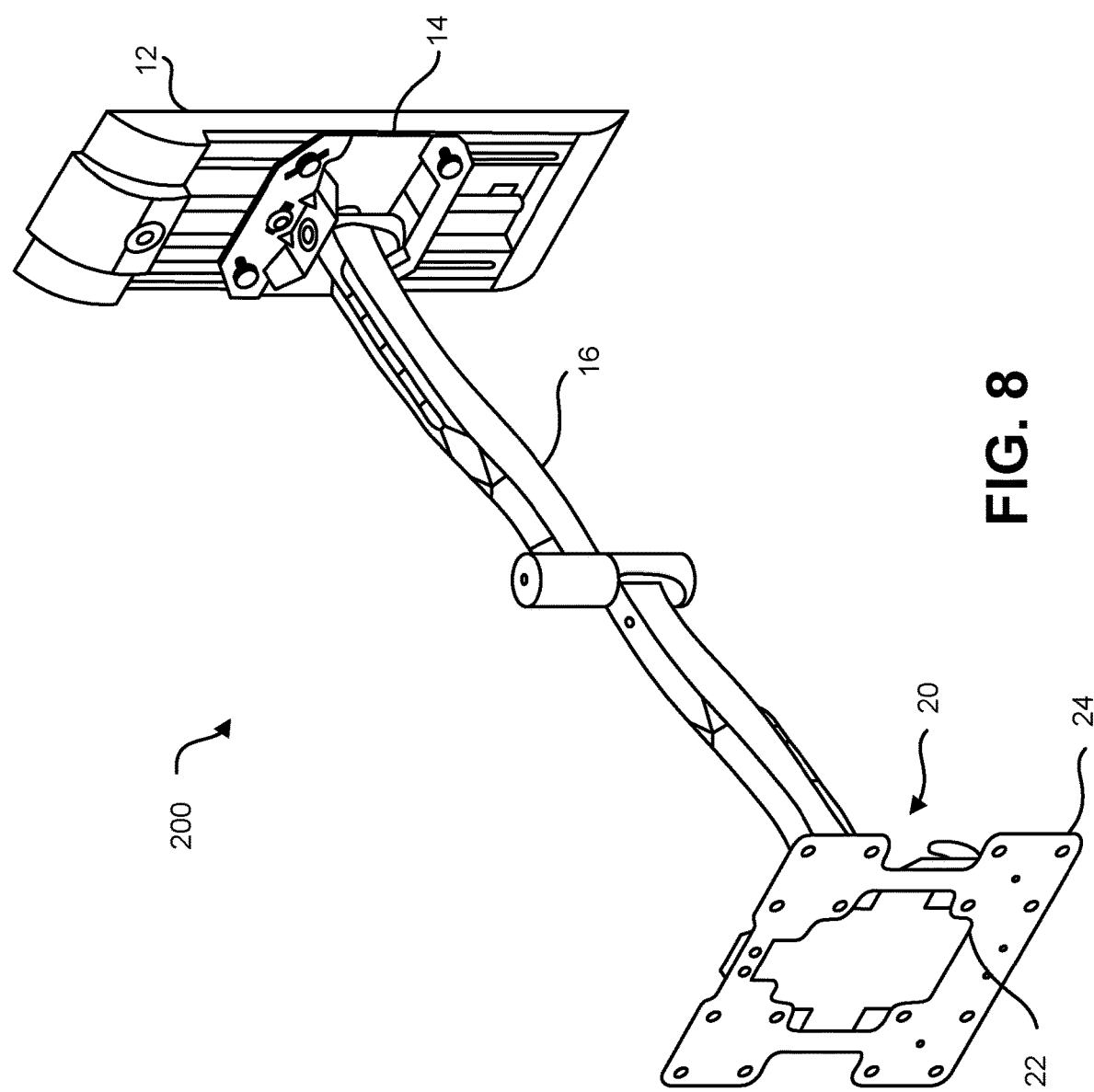
FIG. 8 is a perspective view of a display mount according to another implementation.
Figure 9:
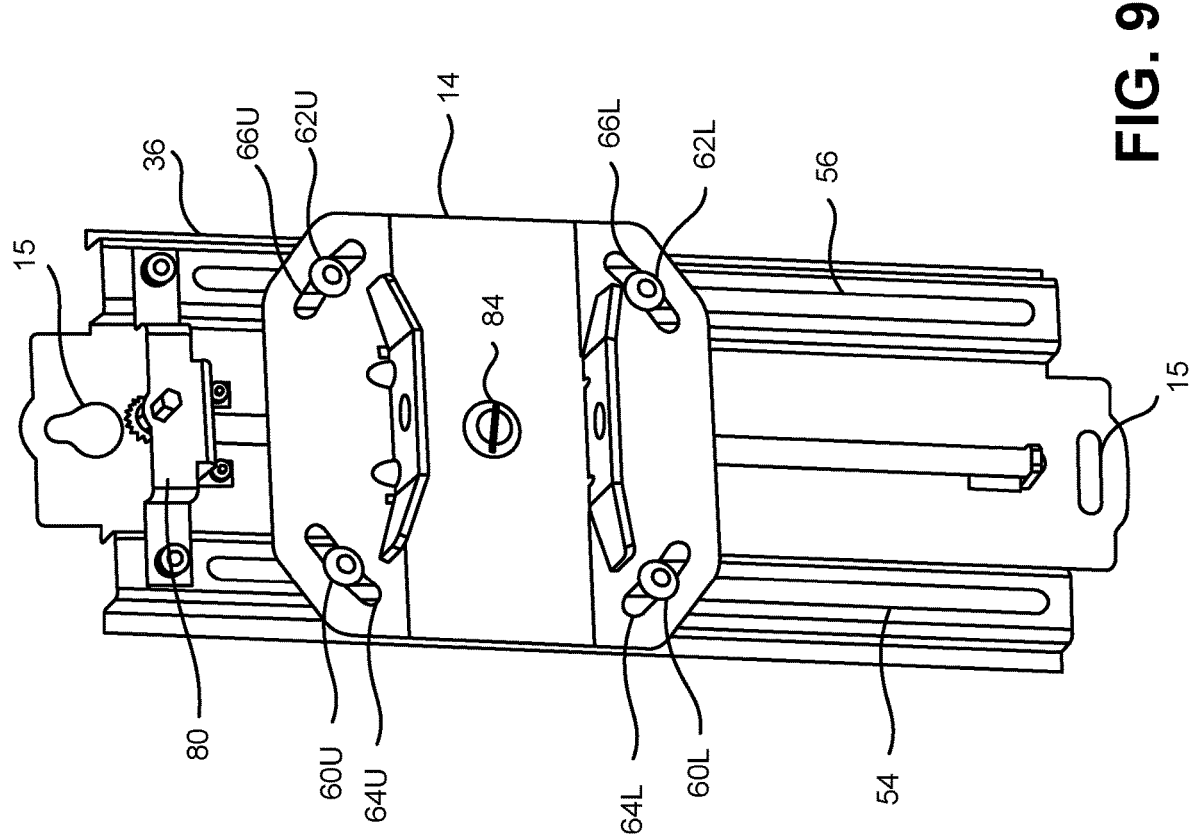
FIG. 9 is a front perspective view of a wall mount assembly of the display mount of FIG. 8.
Figure 10:
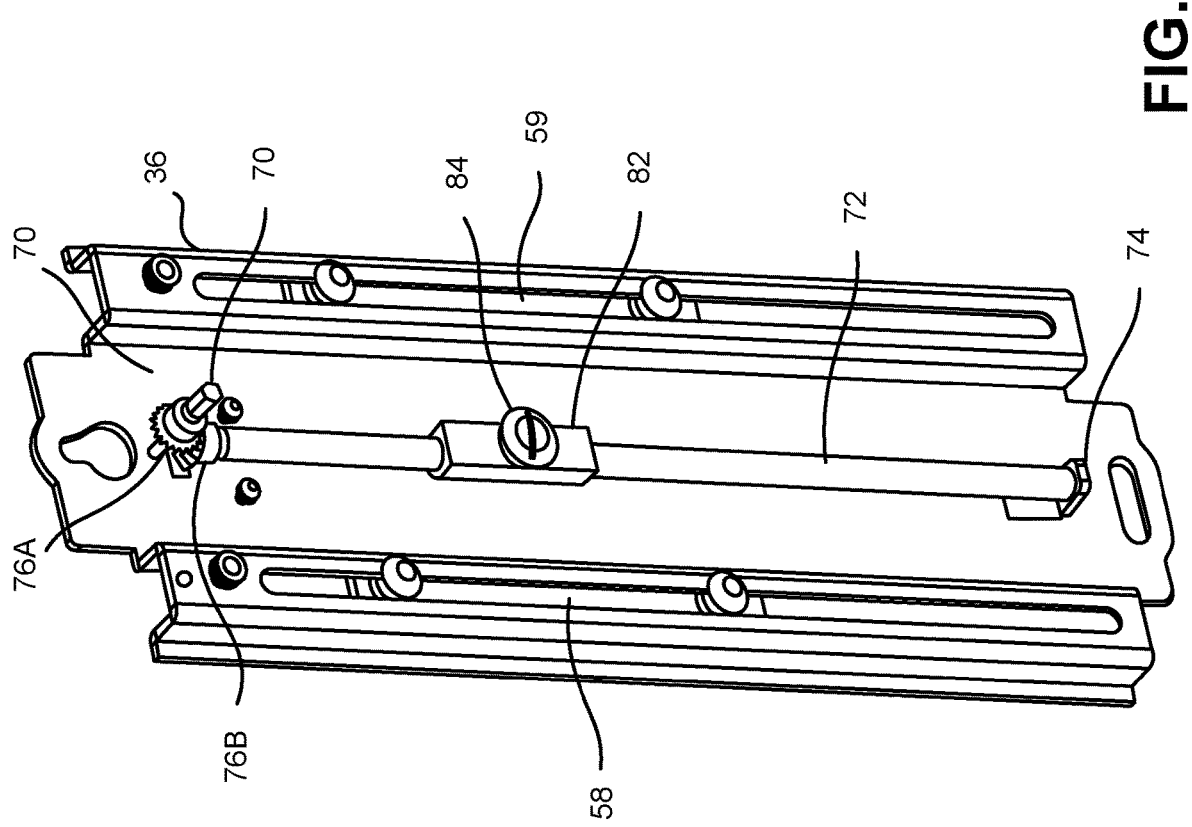
FIG. 10 is a front perspective view of the wall mount assembly of FIG. 9 with certain components removed to illustrate vertical adjustment features.

A display mount 200 according to some other implementations is illustrated in FIGS. 8-10. The display mount 200 includes many similar features to the display mount 100 as indicated by the common reference numbers (e.g., reference number 12 in FIG. 8 corresponds to reference number 12 in FIG. 1, and so forth). A difference is that the display mount 200 includes only one articulating arm 16 with the display mount 200 configured to hold a smaller display than the display mount 100. A display such as a television can be mounted to the mount head assembly 20 similar to the mount head assembly 20 as shown in FIG. 1.

Another difference is the absence of the upper and lower wall rails in display mount 200. The vertical track 36 includes mounting features 15 such as apertures for mounting the mount 200 to the wall. The vertical track 36 may be referred to herein as a wall bracket for the mount 200.

It is noted that the mount 200 includes the vertical height adjustment mechanism 70 to provide the advantages described above with regard to the display mount 100. As illustrated in FIGS. 9 and 10, the lead nut 82 may attach to the wall plate 14 with a single fastener 84 (as opposed to multiple fasteners 86, 90 as depicted in the implementation of display mount 100 for FIGS. 1-7).

Figure 11:
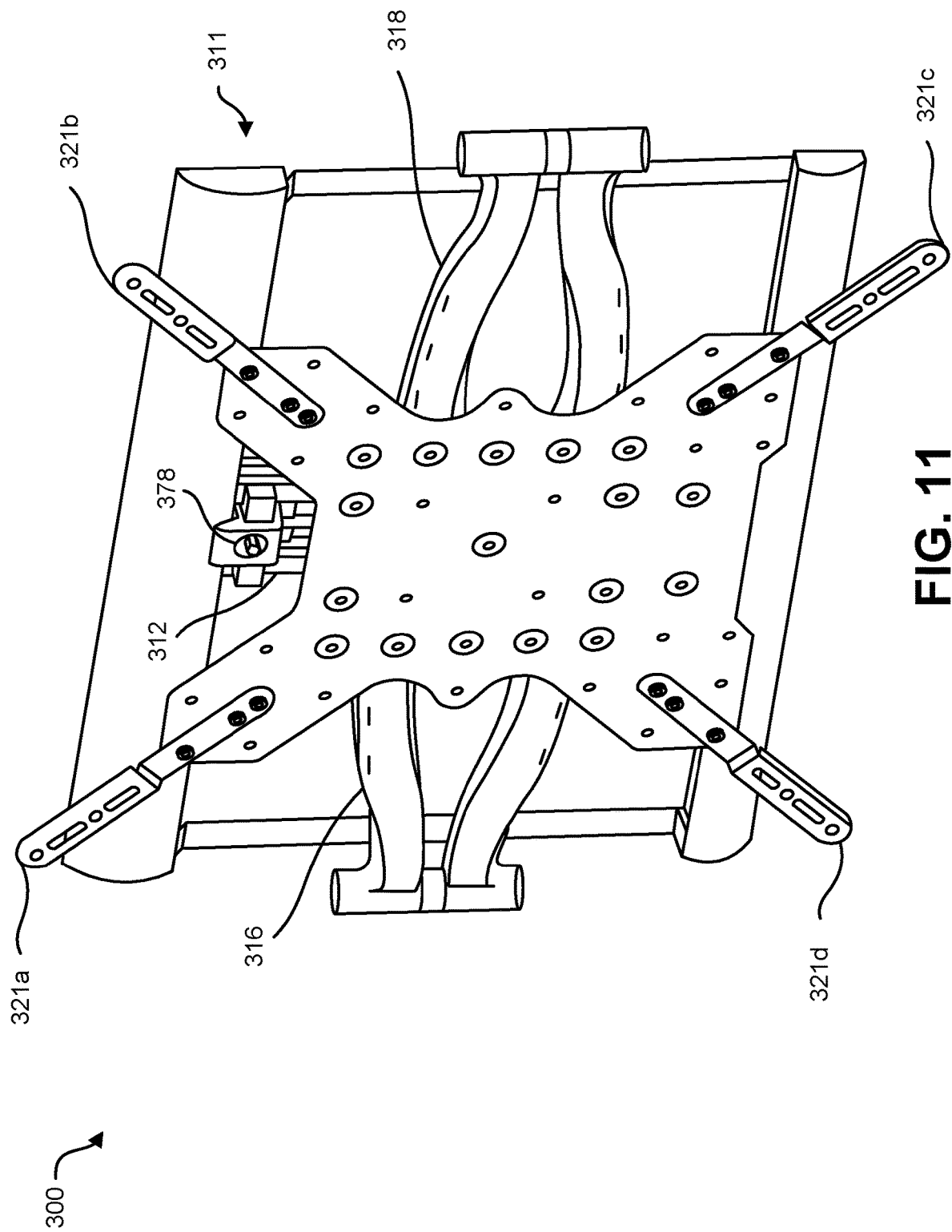
FIG. 11 is a perspective view of a display mount according to another implementation.

FIG. 11 is a front perspective view of a display mount 300 according to another implementation. The display mount 300 may include a wall bracket 311, a wall mount assembly 312, a first articulating arm 316, a second articulating arm 318, and a mount head assembly 320 implemented in accordance with the display mount 100 described in connection with FIGS. 1-7 and/or display mount 200 described in connection with FIGS. 8-10. The height of the mount head assembly 320 may be adjusted by rotating the drive mechanism 378, as described above in connection with display mount 100 and/or display mount 200. The horizontal position may be adjusted as described above in connection with display mount 100.

In this implementation, a leveling mechanism (not shown) may be implemented on the mount head assembly 320. An example of this implementation of the leveling mechanism is described in connection with FIG. 13.

In some examples, the mount head assembly 320 may include display attachment arms 321A-D. A display may be mounted on at least one of the display attachment arms 321A-D. The display attachment arms 321A-D may provide flexibility for attaching different displays.

In some examples, the display mount 300 may include three (or more) wheels configured to roll in an upper channel of the wall bracket 311. In some examples, the display mount 300 may include a slider configured to slide in a lower sliding rail of the wall bracket 311.

Figure 12:
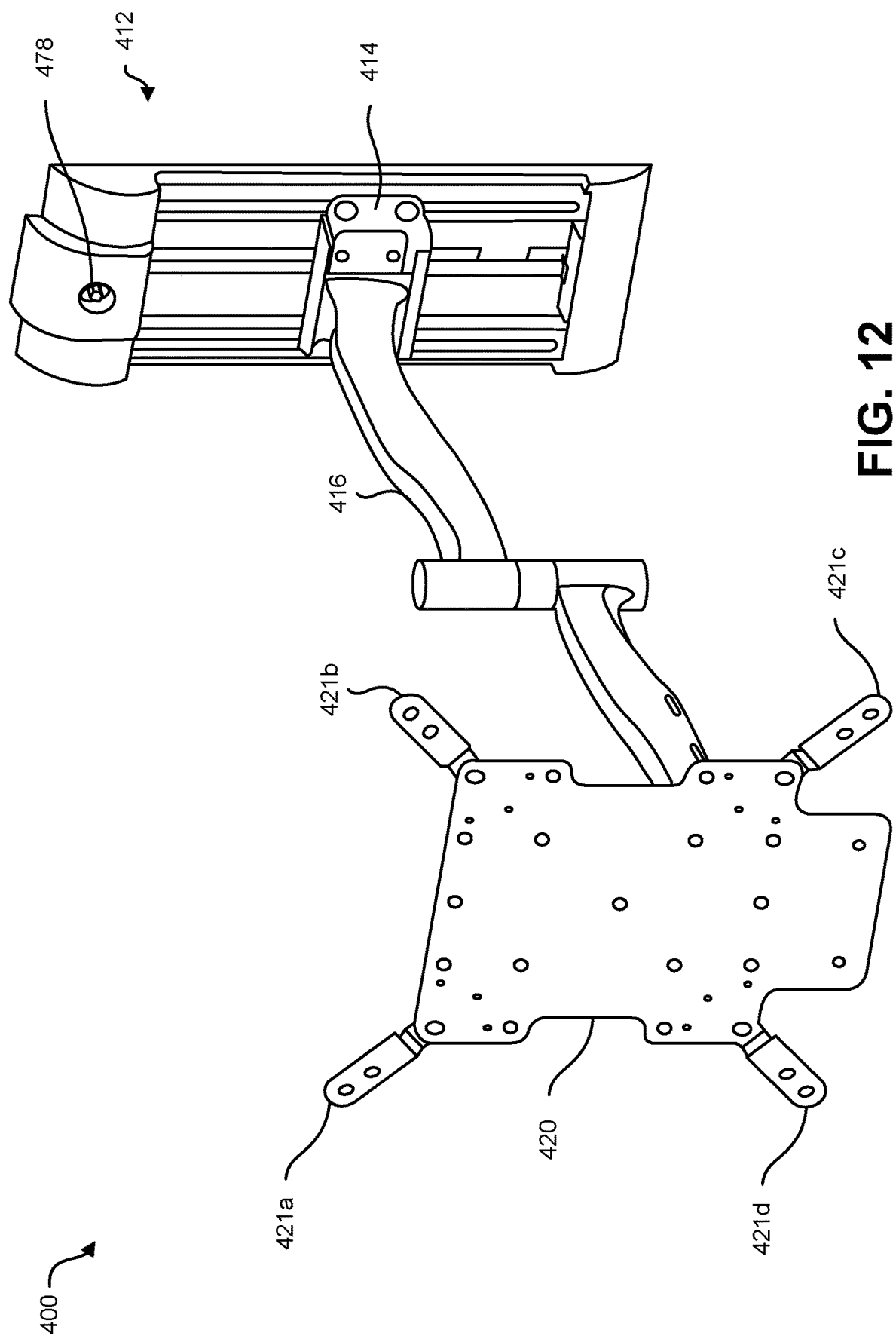
FIG. 12 is a perspective view of a display mount according to yet another implementation.
Figure 13:
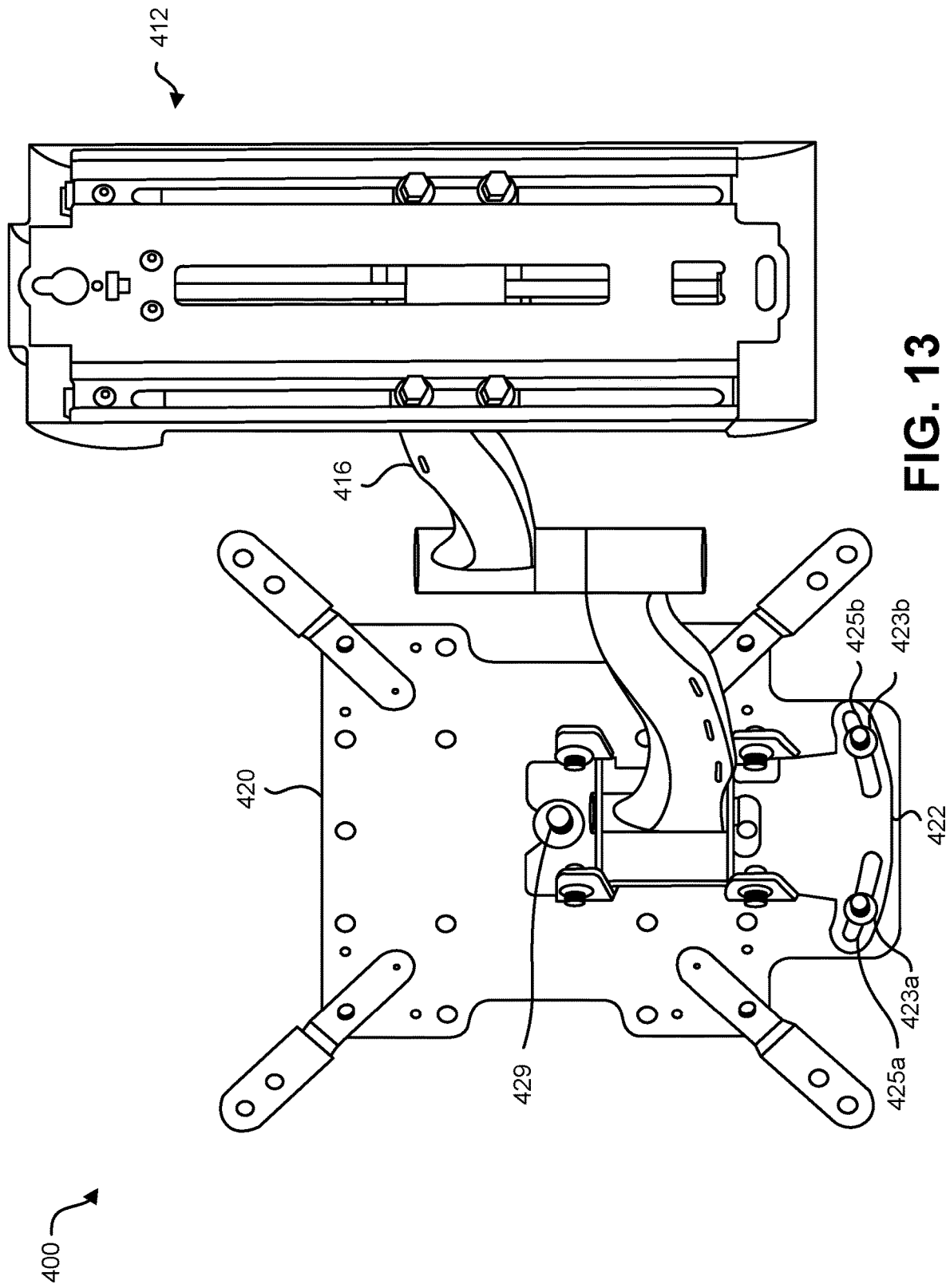
FIG. 13 is a rear perspective view of the display mount of FIG. 12.
Figure 14:
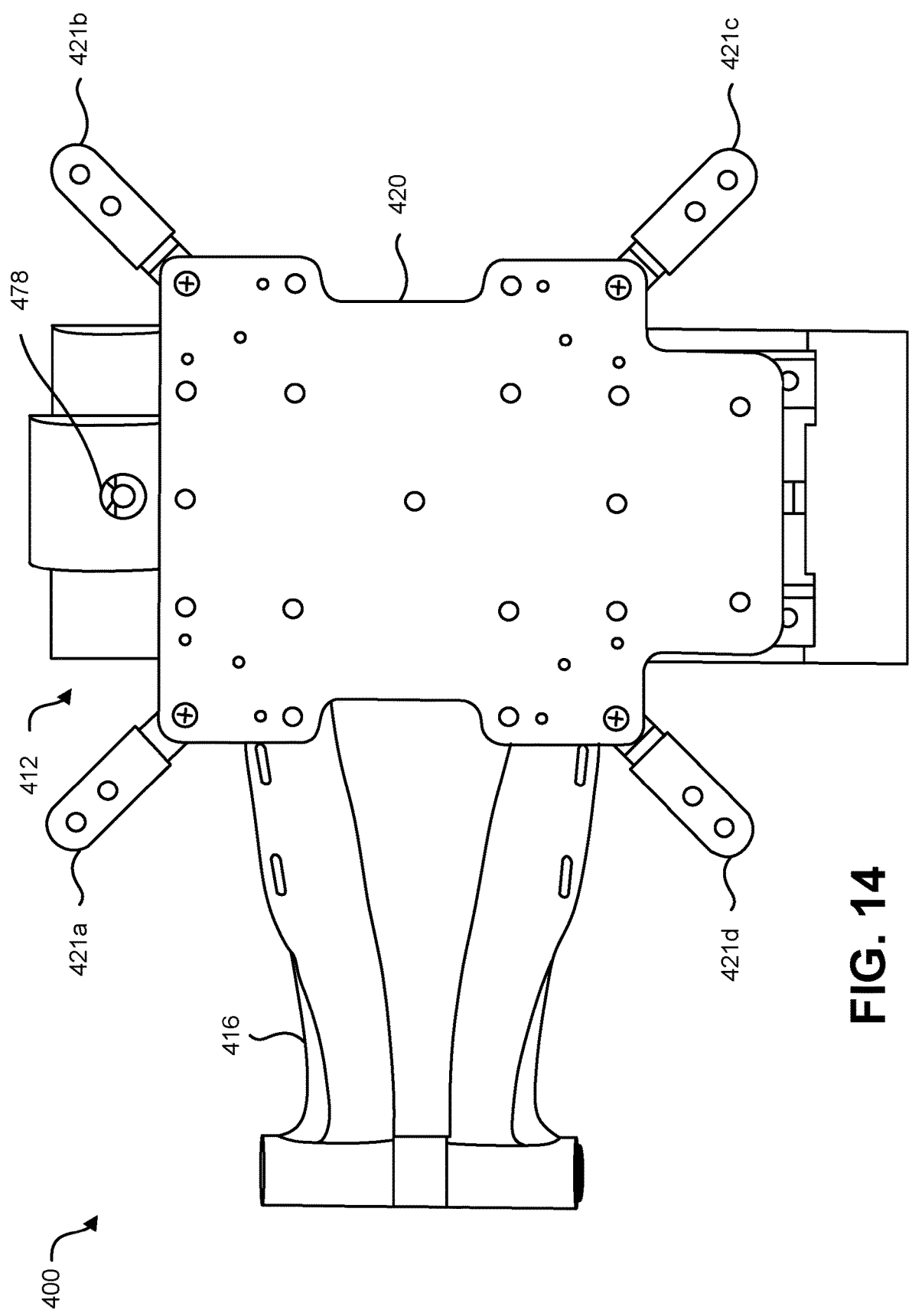
FIG. 14 is a front view of the display mount of FIG. 12.

A display mount 400 according to another implementation is illustrated in FIGS. 12-14. The display mount 400 may include a wall mount assembly 412, an articulating arm 416, and a mount head assembly 420 implemented in accordance with the display mount 100 described in connection with FIGS. 1-7 and/or display mount 200 described in connection with FIGS. 8-10. The height of the mount head assembly 420, articulating arm 416 and wall plate 414 may be adjusted by rotating the drive mechanism 478, as described above in connection with display mount 100 and/or display mount 200.

In some examples, the mount head assembly 420 may include display attachment arms 421A-D. A display may be mounted on at least one of the display attachment arms 421A-D. The display attachment arms 421A-D may provide flexibility for attaching different displays.

The mount 400 may also include a leveling mechanism that allows the mount head assembly 420 to be adjusted clockwise or counterclockwise to level the display. With reference to FIG. 13, a mount head 422 may attach to the articulating arm 416. The mount head 422 may facilitate rotation of the mount head assembly 420 about the articulating arm 416. The mount head 422 may include at least one slot 425. In the implementation illustrated in FIG. 13, the mount head 422 includes a first slot 425*a* and a second slot 425*b*. The slots 425*a-b* may be formed with a curve to facilitate rotation about a fastener 429. First fasteners 423*a*, 423*b* and the second fastener 429 may attach the mount head assembly 420 to the mount head 422. The fasteners 423*a*, 423*b* and 429 may be loosened (e.g., rotated in a first direction) and the mount head assembly 420 leveled by rotating the mount head assembly 420 clockwise or counterclockwise with the first fasteners 423*a* and 423*b* translating in the slots 425*a* and 425*b*, respectively.

Figure 15:
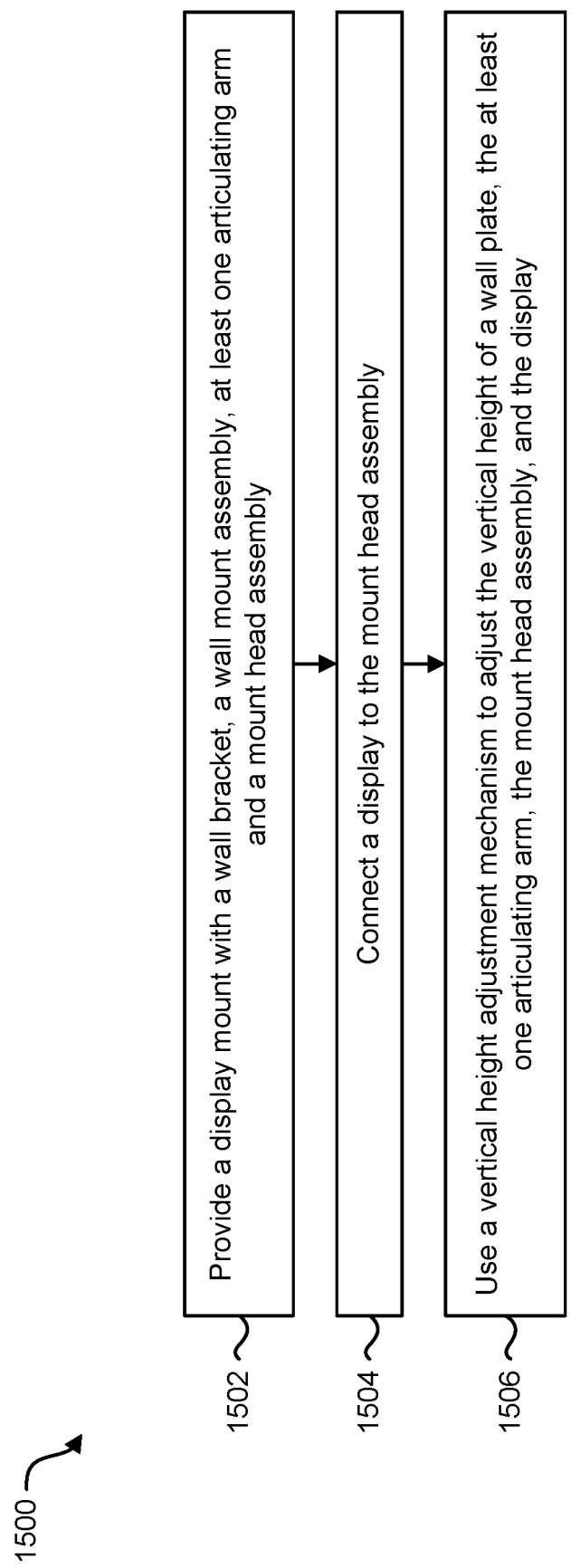
FIG. 15 is a flow diagram illustrating a method for implementing a display mount.

FIG. 15 is a flow diagram illustrating a method 1500 for implementing a display mount. A display mount may be provided 1502. For example, the display mount may be provided 1502 according to the display mount 100, 200, 300 and/or 400 as described herein. The display mount may include a wall bracket and a wall mount assembly connected to the wall bracket. The wall mount assembly may include a wall plate and a vertical height adjustment mechanism. The display mount may also include at least one articulating arm with a first end of the at least one articulating arm connected to the wall plate. The display mount may further include a mount head assembly connected to a second end of the at least one articulating arm.

The method 1500 may also include connecting 1504 a display to the mount head assembly. For example, the display (e.g., a television, computer monitor, medical device display, etc.) may attach to one or more connection points on a display bracket of the mount head assembly.

The method 1500 may further include using 1506 the vertical height adjustment mechanism to adjust a vertical height of the wall plate, the at least one articulating arm, the mount head assembly, and the display. For example, the vertical height adjustment mechanism may include a drive mechanism, a gear assembly connected to the drive mechanism, a lead screw connected to the gear assembly, and a lead nut received on the lead screw. The lead nut may be connected to the wall plate. The wall plate, the at least one articulating arm, the mount head assembly, and the display may move upward in response to rotating the drive mechanism in a first direction. The wall plate, the at least one articulating arm, the mount head assembly, and the display may move downward in response to rotating the drive mechanism in a second, opposite direction.

In some examples, the wall mount assembly may include a horizontal adjustment mechanism. In these examples, the method 1500 may include using the horizontal adjustment mechanism to adjust a horizontal position of the wall plate, the at least one articulating arm, the mount head assembly, and the display after connecting the display to the mount head assembly.

In some examples, the wall bracket may include an upper wall rail defining an upper channel and a lower wall rail defining a lower channel. The wall mount assembly may include a vertical track. The horizontal adjustment mechanism may include at least one upper roller connected to an upper portion of the vertical track and at least one lower roller connected to a lower portion of the vertical track. The at least one upper roller may be received in the upper channel and the at least one lower roller may be received in the lower channel.

The method 1500 may include applying a force to at least one of the vertical track, the wall plate, the at least one articulating arm, the mount head assembly, and the display. For example, a user may grab at least one of the vertical track, the wall plate, the at least one articulating arm, the mount head assembly, or the display and apply a force (e.g., push or pull). The method 1500 may further include moving the at least one of the vertical track, the wall plate, the at least one articulating arm, the mount head assembly, and the display left or right such that the at least one upper roller rolls in the upper channel and the at least one lower roller rolls in the lower channel.

In some examples, the wall mount assembly includes a leveling mechanism on the wall plate. In this case, the method 1500 may include using the leveling mechanism to level the wall plate, the at least one articulating arm, the mount head assembly, and the display after connecting the display to the mount head assembly.

In some examples, the mount head assembly may include a leveling mechanism. In this case, the method 1500 may include using the leveling mechanism to level the mount head assembly and the display after connecting the display to the mount head assembly.

The foregoing is illustrative of the present apparatus, systems and methods and is not to be construed as limiting thereof. Although a few exemplary implementations have been described, those skilled in the art will readily appreciate that many modifications are possible in the exemplary implementations without materially departing from the teachings and advantages of the apparatus, systems and methods. Accordingly, all such modifications are intended to be included within the scope of the apparatus, systems and methods as defined in the claims. The apparatus, systems and methods are defined by the following claims, with equivalents of the claims to be included therein.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. A display mount comprising:
a wall bracket;
a wall mount assembly connected to the wall bracket, the wall mount assembly comprising a wall plate;
a leveling mechanism configured to level the wall plate, wherein the leveling mechanism comprises an upper slot defined in an upper portion of the wall plate and a first fastener received in the upper slot, and a lower slot defined in a lower portion of the wall plate and a second fastener received in the lower slot;
at least one articulating arm with a first end of the at least one articulating arm connected to the wall plate; and
a mount head assembly connected to a second end of the at least one articulating arm, the mount head assembly configured to receive a display thereon,
wherein the wall mount assembly comprises a vertical height adjustment mechanism that is configured to adjust a vertical height of the wall plate.

2. The display mount of claim 1, wherein:
the vertical height adjustment mechanism comprises a drive mechanism, a gear assembly connected to the drive mechanism, a lead screw connected to the gear assembly, and a lead nut received on the lead screw;
the lead nut is connected to the wall plate; and
the wall plate moves upward in response to rotation of the drive mechanism in a first direction and moves downward in response to rotation of the drive mechanism in a second, opposite direction.

3. The display mount of claim 1, wherein the vertical height adjustment mechanism is configured to adjust a vertical height of the wall plate, the at least one articulating arm, the mount head assembly, and a display connected to the mount head assembly.

4. The display mount of claim 1, wherein the first and second fasteners are each connected to the lead nut.

5. A display mount comprising:
a wall bracket;
a wall mount assembly connected to the wall bracket, the wall mount assembly comprising:
a wall plate,
a vertical height adjustment mechanism that is configured to adjust a vertical height of the wall plate, and
a horizontal adjustment mechanism configured to adjust a horizontal position of the wall plate;
a leveling mechanism configured to level the wall plate, wherein the leveling mechanism comprises an upper slot defined in an upper portion of the wall plate and a first fastener received in the upper slot, and a lower slot defined in a lower portion of the wall plate and a second fastener received in the lower slot;
at least one articulating arm with a first end of the at least one articulating arm connected to the wall plate; and
a mount head assembly connected to a second end of the at least one articulating arm, the mount head assembly configured to receive a display thereon.

6. The display mount of claim 5, wherein:
the wall bracket comprises an upper wall rail defining an upper channel and a lower wall rail defining a lower channel;
the wall mount assembly comprises a vertical track.

7. The display mount of claim 6, wherein:
the horizontal adjustment mechanism comprises at least one upper roller or slider connected to an upper portion of the vertical track and at least one lower roller or slider connected to a lower portion of the vertical track; and
the at least one upper roller or slider is received in the upper channel and the at least one lower roller or slider is received in the lower channel.

8. The display mount of claim 6, wherein the horizontal adjustment mechanism comprises a fastener configured to engage one of the upper and lower rails to lock the horizontal adjustment mechanism.

9. The display mount of claim 5, wherein the horizontal adjustment mechanism is configured to adjust a horizontal position of the vertical track, the wall plate, the at least one articulating arm, the mount head assembly, and a display connected to the mount head assembly.

10. A method comprising:
providing a display mount comprising:
a wall bracket;
a wall mount assembly connected to the wall bracket, the wall mount assembly comprising a wall plate and a vertical height adjustment mechanism;
a leveling mechanism configured to level the wall plate, wherein the leveling mechanism comprises an upper slot defined in an upper portion of the wall plate and a first fastener received in the upper slot, and a lower slot defined in a lower portion of the wall plate and a second fastener received in the lower slot;
at least one articulating arm with a first end of the at least one articulating arm connected to the wall plate; and a mount head assembly connected to a second end of the at least one articulating arm;

connecting a display to the mount head assembly; and using the vertical height adjustment mechanism to adjust a vertical height of the wall plate, the at least one articulating arm, the mount head assembly, and the display.

11. The method of claim 10, wherein:

the vertical height adjustment mechanism comprises a drive mechanism, a gear assembly connected to the drive mechanism, a lead screw connected to the gear assembly, and a lead nut received on the lead screw; and the lead nut is connected to the wall plate.

12. The method of claim 11, wherein using the vertical height adjustment mechanism to adjust a vertical height of the wall plate comprises:

moving the wall plate, the at least one articulating arm, the mount head assembly, and the display upward in response to rotating the drive mechanism in a first direction; and moving the wall plate, the at least one articulating arm, the mount head assembly, and the display downward in response to rotating the drive mechanism in a second, opposite direction.

13. The method of claim 10, wherein:

the wall mount assembly comprises a horizontal adjustment mechanism, and the method further comprises, after connecting the display to the mount head assembly, using the horizontal adjustment mechanism to adjust a horizontal position of the wall plate, the at least one articulating arm, the mount head assembly, and the display.

14. The method of claim 13, wherein:

the wall bracket comprises an upper wall rail defining an upper channel and a lower wall rail defining a lower channel;

the wall mount assembly comprises a vertical track;

the horizontal adjustment mechanism comprises at least one upper roller connected to an upper portion of the vertical track and at least one lower roller connected to a lower portion of the vertical track; and the at least one upper roller is received in the upper channel and the at least one lower roller is received in the lower channel.

15. The method of claim 14, further comprising:

applying a force to at least one of the vertical track, the wall plate, the at least one articulating arm, the mount head assembly, and the display; and moving the at least one of the vertical track, the wall plate, the at least one articulating arm, the mount head assembly, and the display left or right such that the at least one upper roller rolls in the upper channel and the at least one lower roller rolls in the lower channel.

16. The method of claim 10, wherein:

the method further comprises, after connecting the display to the mount head assembly, using the leveling mechanism to level the wall plate, the at least one articulating arm, the mount head assembly, and the display.

17. The method of claim 10, wherein:

the method further comprises, after connecting the display to the mount head assembly, using the leveling mechanism to level the mount head assembly and the display.

* * * * *